July 14, 1953

W. R. DAVIES 2,645,228

CORNHUSKER HAVING ROLLS OF ALTERNATE
METAL AND RUBBER SECTIONS

Filed Jan. 19, 1951

INVENTOR.
WALTER R. DAVIES
BY
ATTORNEYS

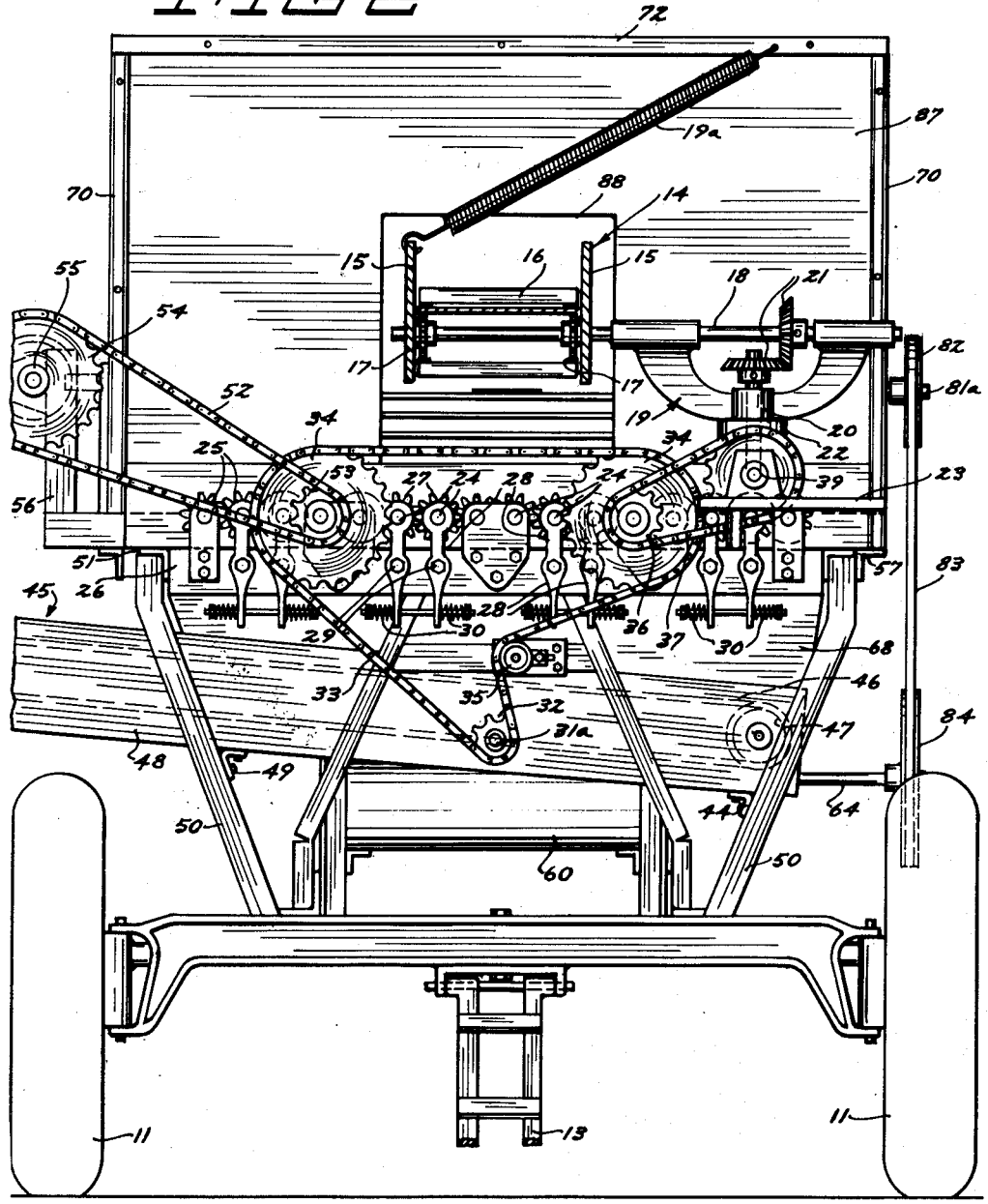

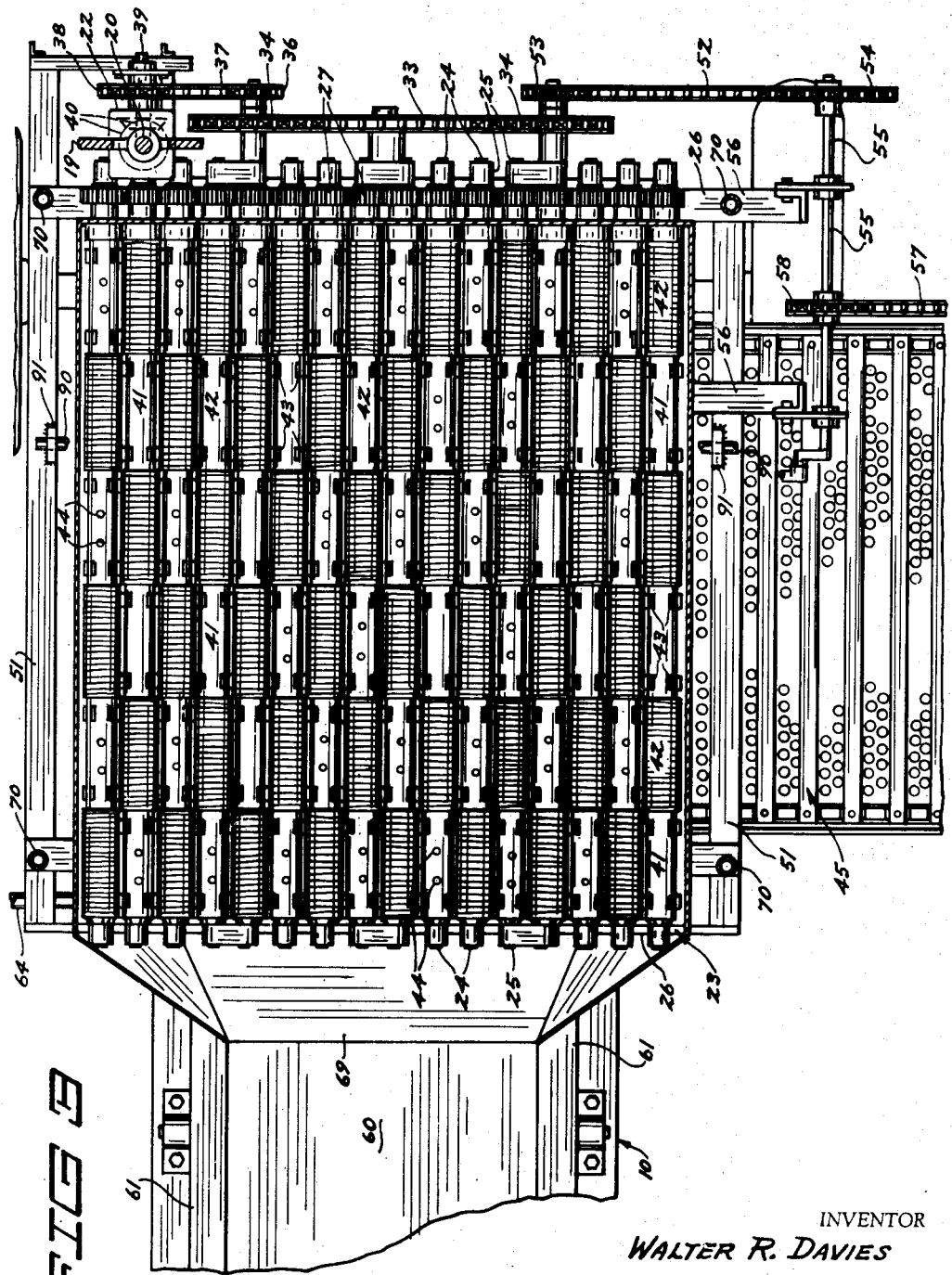

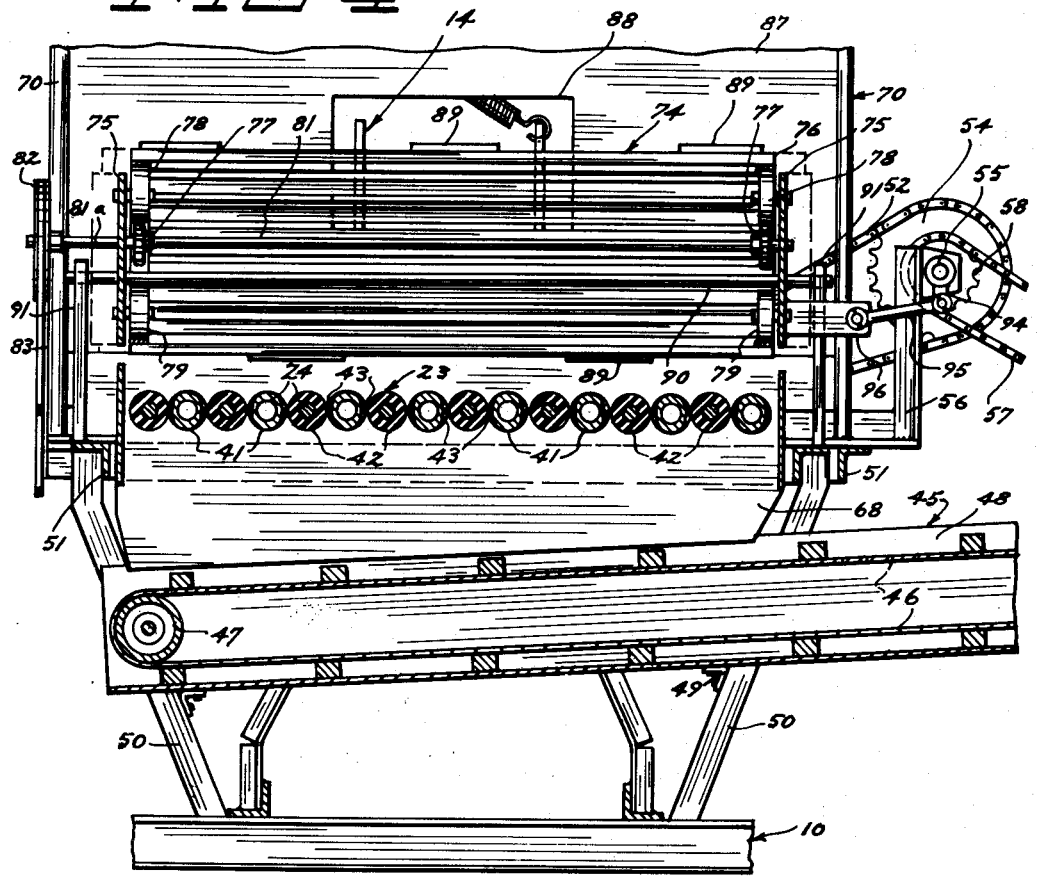

UNITED STATES PATENT OFFICE 2,645,228

CORNHUSKER HAVING ROLLS OF ALTERNATE METAL AND RUBBER SECTIONS

Walter R. Davies, Shakopee, Minn., assignor to Minneapolis-Moline Company, Hopkins, Minn., a corporation of Minnesota Application January 19, 1951, Serial No. 206,899

2 Claims. (Cl. 130—5)

This invention relates to improvements in machines for husking corn and the primary object of the invention is to provide a machine which will rapidly and cleanly strip the husks and silks from the ears, with a minimum shelling of the corn.

Another object of the invention is to provide a corn husker having improved husking roll mechanism, each roll of which is made up of alternate sections of substantially smooth surfaces of metal and rubber, or analogous materials, and with said sections of substantially equal length and each of said sections being of a length at least comparable with the length of an average ear of corn. These sections accordingly will have differing coefficients of friction and will exert varying frictional forces upon the corn being husked. As usual, adjacent rolls are rotated in opposite directions, with the adjacent surfaces moving downwardly, and they cooperate to form what may be described as a V-shaped trough along which the ears of corn will progress as the husks are stripped therefrom and worked down between the rolls. Further in accordance with this object of my invention the adjacent rolls are so arranged that the aforesaid differing sections thereof will be alternated and in each case each section of a higher coefficient of friction will rotate in opposition to a section on the other roll of a lesser coefficient of friction. Thus as the ears of corn progress along said trough they will be alternately subjected to the action of oppositely rotating sections of the rolls having the greater coefficients of friction, with the result that the ears will be intermittently rotated in opposite directions in passing from one end of the trough to the other. In practice I find that this alternate, opposite rotation of the ears has a very thorough husking effect, and, furthermore, that it tends to agitate the corn so that the ears are straightened out and caused to travel through said trough and thoroughly worked upon by the rolls, all as will be explained in detail hereafter.

Still another object of the invention is to provide an improved husking apparatus with a husking bed, a superimposed retarder apron for holding the corn to the bed, and with mechanism for reciprocating the apron in a direction at right angles to the length of the husking rolls to thereby work the corn across the rolls and increase the desired rubbing effect by which the husks and silks are stripped from the ears.

Further objects of the invention are to generally improve the construction and operation of machines of this nature and will be made apparent in the course of the following specification, wherein reference is had to the accompanying drawings, in which:

Fig. 2 is an enlarged front end elevation, partially in section, taken along the line 2—2 in Fig. 1.

Fig. 3 is a plan view of the husking bed, with some parts in section, as viewed along the line 3—3 in Fig. 1.

Fig. 4 is a fragmentary vertical cross section along the line 4—4 in Fig. 1.

Fig. 5 is a fragmentary plan view of a forward corner of the ear retarder apron.

Figure 1:
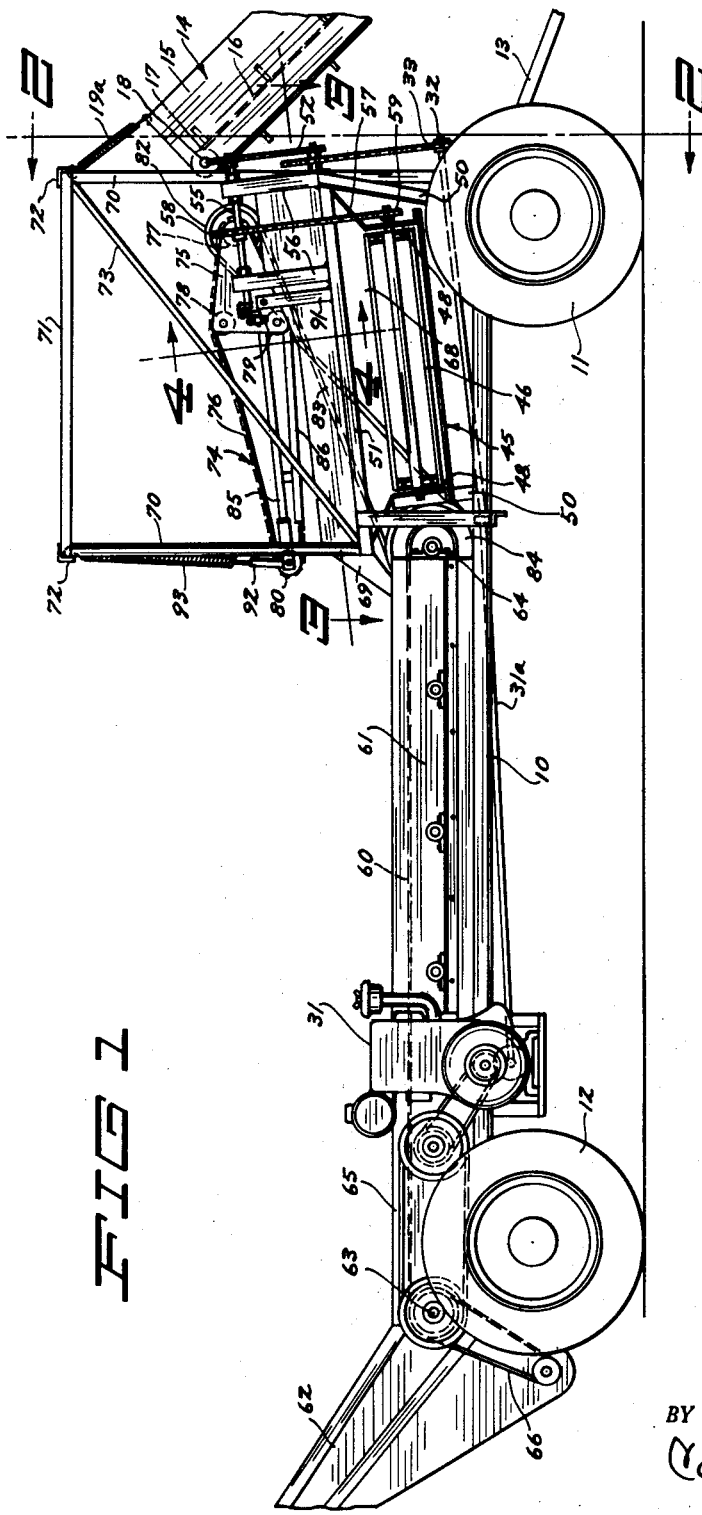
Fig. 1 is a side elevation of a corn husker according to the present invention, with certain elevator parts thereof broken away.

Referring now more particularly and by reference characters to the drawing, I have shown my improved corn husker as comprising a chassis or main frame 10, supported by front and rear wheel pairs 11 and 12, with a draft tongue 13 by which the machine may be moved about and the front wheels 11 steered in the usual manner. The forward part of the frame 10 is occupied by the husking mechanism, per se, and the corn for husking thereby is delivered by a conventional elevator 14 comprising frame sides 15 and an endless conveyor 16 which operates at its delivery end over drive sprockets 17 carried by a head shaft 18. This shaft 18 is journaled in a swingable bearing yoke 19 journaled about an upright shaft 20 in such fashion that the entire elevator 14 may be swung from its normal downwardly and forwardly angled working position, shown in Fig. 1, around to a reversed position at which it will extend back along the left hand side of the machine for transport. A part of the load on shaft 18 is counterbalanced by an angularly arranged coil spring 19$^a$. This motion of the elevator takes place about the axis of the shaft 20 and this shaft, along with the aforesaid head shaft 18, carries beveled gears 21 through which drive is transmitted to the elevator, without interference from the aforesaid swinging motions thereof from working to transport positions. The shaft 20 is journaled in an upright bearing housing 22, carried by a frame bracket 23 at the fore end of the machine and is power operated, as will presently appear.

The husking mechanism comprises a husking bed, designated generally at 23, made up of a considerable number of husking rolls, all of which are positioned in the same transverse plane and which angle downwardly and rearwardly from their front to their rear ends. As is customary in such constructions these husking rolls have shaft ends 24 which are journaled in bearings 25 at front and rear sill members 26, while at the front ends these shafts extend through and carry cooperating loosely meshing gears 27 so that each roll will rotate in a direction opposite that next alongside. In addition, as seen in Fig. 2, certain of the shafts 24 are carried in swingably mounted arms 28, pivoted at 29 to the sills 26 and engaged by springs 30 in such fashion as to urge the husking rolls yieldably together. As stated, this latter construction is wholly conventional so that further explanation should not be required herein, but it is to be noted that according to the present invention there are preferably a great number of such rolls employed and they are all in line so as to provide a flat husking bed, as contrasted to the usual staggered arrangement of the rolls, for a purpose which will presently appear.

These husking rolls, as well as all other operating parts of the machine, are driven by an internal combustion engine 31, supported near the rear of the frame 10 and operating an elongated, forwardly extending shaft 31ᵃ upon the forward end of which is a sprocket 32, appearing in Figs. 1 and 2. A sprocket chain 33 is trained over this sprocket 32 and over large sprocket gears 34, fitted upon the forward shaft ends 24 of a spaced pair of the husking rolls. An adjustable idler pulley 35 is then provided to take up slack in the chain 33, and this double drive to the two sprockets 34 will, of course, operate all of the husking rolls in unison and results in a better equalization of the load than is the case with the single drive sprocket customarily employed. At this point it may be noted that a smaller sprocket gear 36 is fitted over the husking roll shaft carrying the sprocket 34 nearest the bearing housing 22 and drive is transmitted to the elevator drive shaft 20 by means of a sprocket chain 37, as seen in Figs. 2 and 3. This chain 37 operates over the sprocket 36 and over a larger sprocket 38, carried by a forwardly extending shaft 39, the rear end of which is connected by mating beveled gears 40 with the shaft 20 and within the bearing housing 22.

In accordance with the present invention the individual husking rolls, which go to make up the husking bed 23, are each made up of a number of distinct hard and soft (comparatively) sections of substantially equal length, and each section of a length at least comparable with the length of an average ear of corn, as designated at 41 and 42 throughout. The sections 41 are of metal, having the usual husking teeth 43, while the sections 42 are made up of a number of layers or disks of resilient material, such as a combination of rubber and fabric. As a matter of fact, these sections 42 are made up from disks cut from old pneumatic tire casings and suitably held together by and between the metal sections 41. In setting up the husking bed the roll sections 41 and 42 are staggered in such fashion that the metal sections 41 will always run adjacent the resilient sections 42 of adjacent rolls, as clearly shown in Fig. 3. In addition to the husking teeth 43, the metal sections 41 may also be provided with openings, as indicated in some instances at 44, for the accommodation of the usual removable husking pegs, where the nature of the work requires the increased husking action afforded by such pegs.

This husking bed 43 is supported above a laterally extending shuck raddle designated at 45, having the usual endless conveyor 46, operating over sprockets 47, between frame sides 48. This raddle is, of course, for delivering the shucks out from the side of the machine, and for this purpose the frame assembly is supported by brackets 49 between upright frame bars 50 which rise from the main frame 10 and carry the sills 26 for the husking bed between forwardly and rearwardly extending side bars 51. The raddle 45 is thus so positioned as to receive husks falling from the husking bed 43 and the conveyor 46 is driven by a sprocket chain 52 operating over sprockets 53 and 54, the first of which is carried adjacent the aforesaid sprocket gear 34 and the second of which is secured upon a countershaft 55 extending alongside the upper portion of the frame in an elevated position and journaled in upright bearing equipped support bars 56, supported by the adjacent side bar 51. Drive transmission to the raddle 45 is then completed by another sprocket chain 57 operating over a sprocket 58 upon the countershaft 55 and over a sprocket 59 carried by the shaft which drives the delivery end of the raddle, as seen in Fig. 1.

The husked ears which fall off the rear edge of the husking bed 43 are delivered rearwardly by an ear conveyor belt 60 which operates between conveyor side panels 61 extending along the rear portion of the frame 10, and at the rear end this conveyor delivers to a conventional elevator 62 which swings upon a shaft 63 at the rear end of the frame. This arrangement of the elevator 62 is well known and is for the purpose of permitting it to be swung forwardly and laid over the top of the machine for transport. The forward end of the ear conveyor 60 operates over a transverse shaft 64, journaled in bearings carried by the side panels 61, while the rear end of this conveyor operates over a shaft 63 to which drive is transmitted by a belt 65, operated from the engine 31. Another belt 66, operated off the shaft 63, is arranged to operate the conveyor and blower fan (not shown) of the elevator 62 for delivering the husked corn from the machine.

The details of the various elevators and drives are not important and may be varied according to the manner in which the machine is constructed and according to its intended use. The showing here made is only to indicate the manner in which these parts cooperate with the husking mechanism which itself constitutes the real essence of the invention. It is to be noted also that the husks and silks are directed onto the raddle 45 by a rectangular husk box 68 wherein the husking rolls operate and this box is open at its lower side immediately over the raddle conveyor 46. The husked ears are also guided onto the ear conveyor 60 by a chute 69 at the rear of the husking bed.

Supported at the front of the machine, over the husking bed 23, is an open framework having upright corner parts 70 rising from the side bars 51 and connected at upper ends by longitudinal T bars 71 and cross bars 72. Diagonal braces 73 stiffen this structure and arranged loosely within the framework is an ear retarder apron structure designated generally at 74. This apron structure comprises parallel side panels 75 which line up with the sides of the husking box 68 (Fig. 4) and an endless apron conveyor 76 which runs over sprockets 77, 78, 79 and 80. The first or head sprockets 77 are carried on a head shaft 81 journaled between the panels 75 and extending outwardly to the side at one end 81ª to accommodate a grooved pulley 82 over which runs a belt 83 operated by a pulley 84 carried on a similarly extended end of the ear conveyor shaft 64. The belt 83 is crossed between these pulleys to drive the retarder apron 76 in the proper direction. The sprockets 78—79 are spaced apart vertically at the rear corners of the side panels 75 to spread the apron at this point and the tail sprockets 80 are carried by rearwardly extending frame bars 85 which project from the side panels. The arrangement is thus such that the lower flight of the retarder apron 76 will angle upwardly and forwardly at the front end so that the corn delivered by the elevator 14 will fall beneath and onto the front end of the husking bed 23, while the longer rear part of the underside of the apron will run almost parallel with the husking bed, this part of the apron being held down by frame members 86 forming a part of the apron structure in the usual manner. At the front of the machine a front end sheet 87 joins the corner parts 70 but has an opening 88 to pass the corn from elevator 14.

The ear retarder apron 76 has the usual cross slats and may also carry staggered pads 89 of rubber or the like to increase its rubbing effect upon the corn traveling over the husking bed.

In accordance with the present invention the apron structure 74 is supported for transverse reciprocatory or oscillatory movements and for this purpose a slide rod 90 is supported crosswise above the husking bed by upright side bars 91 and passes through the apron side panels 75. These panels are slidable on this rod 90 and the support is completed by the pivotal attachment of an inverted U-shaped hanger yoke 92 to the rear end of the apron structure and the suspension of this yoke by a coil spring 93 depending from the rear cross bar 72 overhead. At its rear end the countershaft 55 has a crank 94 (Fig. 4) and a short pitman 95 is pivotally connected between this crank and a bracket 96 affixed to the adjacent side of the apron structure. Thus as the countershaft rotates the crank and pitman will translate this rotary motion to a reciprocating transverse movement of the retarder apron structure, during which the apron slides on the rod 90 and swings at its rear end, this motion being also crosswise to the length of the husking rolls.

In the operation of the machine the unhusked corn falls upon the forward end of the husking bed 23 and travels rearwardly over the bed to finally fall from the rear or delivery end after rubbing contact with the husking rolls which removes the husks and silks. The reciprocating retarder apron 74 tends to hold the ears of corn in contact with the husking bed as well as to distribute the corn evenly thereover, due to what may be described as a transverse rubbing effect between the apron itself and the corn. I achieve a relatively very high husking efficiency and in large measure this is attributable to the construction and arrangement of the husking rolls. Referring to Fig. 3 it will be noted that the sections 42, which are made up of rubber disks or analogous material, in every case operate next to the metal sections 41, so that throughout the husking bed the sections 42 are alternated or staggered as clearly shown. From the practical standpoint the sections 42 are, as stated, preferably made up from a series of rubber disks and the sections 41 are cast metal, but of vital importance to my invention is the fact that the relative natures of the materials employed, or the textures of the surfaces of these alternating roll sections, are such that the sections 42 will have a relatively high coefficient of friction as contrasted with the much lower coefficient of friction of the sections 41. The gears 27 which connect the rolls cause the rolls to operate in pairs so that they rotate in opposite directions and move downwardly on their adjacent surfaces. Furthermore, these downwardly moving adjacent surfaces of the rolls cooperate to form V-shaped troughs, as seen in Fig. 4, extending from one end of the husking bed to the other and along which troughs the ears of corn progress toward the delivery end aforesaid. Considering then for example the operation of the lowermost pair of rolls shown in Fig. 3 an ear of corn dropped lengthwise into the trough between these rolls will first be engaged by the first section 42 of the lowermost roll, so that this section due to its high coefficient of friction will exert sufficient frictional force or effect to induce the ear to rotate in one direction. But as the ear of corn travels then toward the delivery end aforesaid it will next come into contact with the first section 42 of the other roll which, because it rotates in an opposite direction, will reverse the direction of rotation of the ear. Thus it will be seen that as the ear progresses along the trough between these rolls it will be successively and alternately rotated in opposite directions due to the alternated or staggered arangement of the sections 42 upon the two rolls. Not only does this repeated opposite rotation of the ear increase husking efficiency by bringing all sides of the husks into contact with the rolls, but it will tend to straighten out the ears to bring them into the ideal condition of longitudinal alignment with the rolls while at the same time creating sufficient agitation in the corn moving over the bed to cause ears that may be overlying those directly in contact with the rolls to also work themselves down and straighten themselves out for proper husking. While I have herein shown a considerable number of these sectioned rolls as making up a husking bed of considerable area, it is, of course, the cooperation of each pair of adjacent rolls having the downwardly moving adjacent surfaces which accomplish the husking action and in some instances the rolls may be used in such pairs alone rather than in greater number in order to make up the large husking bed.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A corn husking mechanism comprising at least one pair of substantially smooth surfaced rolls disposed side by side to form a generally V-shaped trough therebetween for receiving ears of corn that move from one end of the trough to the other in frictional contact with the rolls, means for rotating the rolls in opposite directions with adjacent surfaces thereof turning downwardly, each roll having a plurality of sections of substantially equal length, the length thereof being at least that of an average ear of corn with alternate sections made of rubber having a high coefficient of friction and intervening sections of metal having a lower coefficient of friction, the sections of the two rolls being alternated so that the rubber sections of each roll operate opposite the metal sections of the other, whereby as an ear of corn moves along the trough it will be alternately frictionally engaged by the oppositely rotating rubber sections of the rolls and thereby intermittently rotated in opposite directions.

2. A corn husking bed consisting of a plurality of pairs of substantially smooth surfaced husking rolls arranged side by side and extending from one end of the bed to the other, means for rotating each husking roll in a direction opposite to the next adjacent roll so that adjacent downwardly moving surfaces of the rolls form generally V-shaped troughs extending from end to end of the bed to receive corn ears to be husked, each husking roll having a plurality of sections of substantially equal length, the length thereof being at least that of an average ear of corn with alternate sections made of rubber with a high coefficient of friction and intervening sections made of metal with a relatively lesser coefficient of friction, and the rolls being so arranged in the bed that each rubber section rotates opposite a metal section of the next adjacent roll whereby as ears of corn move along the troughs in frictional contact with the rolls the ears will be successively frictionally engaged by oppositely rotating rubber roll sections and the ears will be repeatedly, intermittently rotated in opposite directions as they move from one end of said troughs to the other.

WALTER R. DAVIES.

References Cited in the file of this patent

UNITED STATES PATENTS

| Number | Name | Date |
|---|---|---|
| 641,293 | Holland-Letz | Jan. 16, 1900 |
| 1,695,324 | Duerr | Dec. 18, 1928 |
| 1,810,437 | Powell | June 16, 1931 |
| 2,001,351 | Nuttelman | May 14, 1935 |
| 2,179,579 | Morral | Nov. 14, 1939 |
| 2,239,899 | Nightenhelser | Apr. 29, 1941 |
| 2,295,755 | Powell | Sept. 15, 1942 |
| 2,328,607 | Borchers | Sept. 7, 1943 |
| 2,444,088 | Becker | June 29, 1948 |
| 2,469,687 | Fergason | May 10, 1949 |

OTHER REFERENCES

"Dearborn-Wood Bros. Corn Picker (Model 16-4)" Copyright 1948 by Dearborn Motors Corporation, Detroit 3, Michigan. Pages 43 and 44 relied on.